United States Patent
Gerdsmann et al.

(10) Patent No.: US 11,667,490 B2
(45) Date of Patent: Jun. 6, 2023

(54) ADHESIVE TAPE DISPENSER HAVING A DEFLECTING DEVICE

(71) Applicant: tesa SE, Norderstedt (DE)

(72) Inventors: Thomas Gerdsmann, Hamburg (DE); Peter Himmelsbach, Buxtehude (DE); Michael Zibull, Uetersen (DE)

(73) Assignee: tesa SE, Norderstedt (DE)

( * ) Notice: Subject to any disclaimer, the term of this patent is extended or adjusted under 35 U.S.C. 154(b) by 417 days.

(21) Appl. No.: 16/471,434

(22) PCT Filed: Dec. 21, 2017

(86) PCT No.: PCT/EP2017/084247
§ 371 (c)(1),
(2) Date: Jun. 19, 2019

(87) PCT Pub. No.: WO2018/115371
PCT Pub. Date: Jun. 28, 2018

(65) Prior Publication Data
US 2021/0130122 A1    May 6, 2021

(30) Foreign Application Priority Data
Dec. 22, 2016 (DE) .................... 10 2016 226 058.8

(51) Int. Cl.
*B65H 35/00* (2006.01)

(52) U.S. Cl.
CPC ..... *B65H 35/0026* (2013.01); *B65H 35/0073* (2013.01); *B65H 2301/3411* (2013.01); *B65H 2511/216* (2013.01)

(58) Field of Classification Search
CPC .... B65H 2301/33222; B65H 2301/332; B65H 2301/312; B65H 35/0033; B65H 2301/3411; B65H 2301/322
See application file for complete search history.

(56) References Cited

U.S. PATENT DOCUMENTS 3,318,753 A * 5/1967 Whitlow ............ B65H 35/0033
156/577
3,614,014 A * 10/1971 Nichols .................. G06K 13/26
242/615

(Continued)

FOREIGN PATENT DOCUMENTS

DE     25 10 064 A1    9/1976
DE     36 21 879 A1    1/1988

(Continued)

OTHER PUBLICATIONS

German Search Report dated Sep. 11, 2017 issued in German Application No. 10 2016 226 058.8.

(Continued)

*Primary Examiner* — Alex B Efta
(74) *Attorney, Agent, or Firm* — McGuireWoods LLP

(57) ABSTRACT

An adhesive tape dispenser having a holder for an adhesive tape roll (2) and a guide system for an adhesive tape (3) pulled off from the adhesive tape roll (2) and a deflecting edge (10) for the pulled-off adhesive tape (3). Deflecting edge is arranged at the end of the guide system in the pull-off direction (A) and deflects the pulled-off adhesive tape (3) from the pull-off direction (A). The deflecting edge (10) has a deflection axis, which has a component directed in the pull-off direction (A), and an affixing direction (B) is arranged transversely to the pull-off direction (A).

12 Claims, 8 Drawing Sheets

(56) References Cited

U.S. PATENT DOCUMENTS

| | | | |
|---|---|---|---|
| 3,614,017 A * | 10/1971 | Julien | B65H 75/182 |
| | | | 242/118.3 |
| 3,743,150 A | 7/1973 | Eckart et al. | |
| 4,067,510 A | 1/1978 | McGonagle | |
| 5,051,551 A | 9/1991 | Doyle | |
| 6,189,588 B1 * | 2/2001 | Kakita | B65H 35/0026 |
| | | | 156/522 |
| 2015/0041063 A1 * | 2/2015 | Lam | B65H 35/0013 |
| | | | 156/349 |
| 2016/0023861 A1 | 1/2016 | Ito et al. | |

FOREIGN PATENT DOCUMENTS

| | | |
|---|---|---|
| DE | 43 10 146 C1 | 6/1994 |
| DE | 297 05 259 U1 | 8/1998 |
| DE | 102005034007 A1 | 5/2006 |
| DE | 202007011400 U1 | 12/2008 |
| DE | 202012004079 U1 | 5/2012 |
| EP | 0 072 779 B1 | 9/1984 |
| JP | H06211410 A | 8/1994 |
| JP | H0952652 A | 2/1997 |
| JP | 09183556 | 7/1997 |
| JP | H11292384 A | 10/1999 |
| WO | 8002391 A1 | 11/1980 |

OTHER PUBLICATIONS

German Office Action dated Sep. 12, 2017, issued in German Application No. 10 2016 226 058.8.

International Search Report dated Apr. 24, 2018, issued in PCT/EP2017/084247.

Decision of Final Rejection dated Nov. 2, 2021 issued to Chinese Application No. 201780084215.8.

* cited by examiner

ADHESIVE TAPE DISPENSER HAVING A DEFLECTING DEVICE

TECHNICAL FIELD

The invention relates to an adhesive tape dispenser and a method for affixing an adhesive tape to a component surface.

BACKGROUND

Adhesive tape dispensers are of course basically familiar in the prior art.

From DE 20 2007 011 400 U1 there is known a manual adhesive tape dispenser of compact design. The manual adhesive tape dispenser disclosed therein has a hinged housing with two housing half shells containing an adhesive tape roll in the folded-up condition of the housing. An axle for affixing the adhesive tape roll is formed by two axle supports, inserted into one another and arranged on the inside respectively against one of the two housing half shells. The problem with the manual adhesive tape dispenser is that a guided affixing of a masking tape along an edge at a definite spacing is only possible with difficulty.

DE 10 2005 034 007 A1 discloses a manual device for dispensing an adhesive tape. The adhesive tape consists of a backing provided with an adhesive layer on one side, the adhesive mass of which is covered by a strip of separating material. The manual adhesive tape dispenser makes it possible to loosen the strip of separating material automatically from the adhesive layer of the backing during the application process. Once again, the drawback to this manual adhesive tape dispenser is that a guided application of the adhesive tape along an edge is only possible with difficulty, on the one hand, and on the other hand a handle oriented in the application direction hinders the applying in the application direction.

From DE 20 2012 004 079 U1 there is known a manual adhesive tape dispenser for the applying of an adhesive tape in an application direction to a dirty surface. A cleaning device for surface cleaning is provided here in front of a pressing roll in the application direction.

Neither is this manual adhesive tape dispenser suitable for applying adhesive tape in guided manner up to edges of component surfaces, since the applying of the tape is hindered by the adhesive tape roll.

SUMMARY OF THE INVENTION

In a first aspect, it is an object of the present invention to provide an adhesive tape dispenser which avoids the aforementioned drawbacks.

In a second aspect, it is an object of the present invention to provide a method for the affixing of an adhesive tape which avoids the aforementioned drawbacks.

In regard to the device, the object of the invention is achieved by an adhesive tape dispenser as mentioned above, with the features of claim 1.

The adhesive tape dispenser according to the invention is a preferably hand-held adhesive tape dispenser with a holder for an adhesive tape roll and a guide system for an adhesive tape pulled off from the adhesive tape roll and a deflecting edge for the pulled-off adhesive tape, which deflecting edge is arranged at the end of the guide system in the pull-off direction, deflects the pulled-off adhesive tape from a pull-off direction and has a deflection axis with a component pointing in the pull-off direction and oriented preferably parallel to the pull-off direction. An affixing direction of the adhesive tape according to the invention is arranged after the deflecting edge, transversely to the pull-off direction.

The deflection axis has an axial component perpendicular to the pull-off direction and parallel to the adhesive tape plane. The axial component corresponds to the traditional arrangement of the rotation axes of rollers and the traditional deflecting edges. In this way, the adhesive tape is deflected almost upward and downward. The deflection axis according to the invention has an axial component which is situated parallel to the pull-off direction. By vector addition of the two axial components, the deflection axis results. It is situated transversely to the pull-off direction, i.e., at an angle not corresponding to a right angle.

By the pull-off direction is meant here the direction of the adhesive tape pulled off from the adhesive tape roll immediately before the deflecting edge. The deflecting edge is a three-dimensional edge, but it has a one-dimensional deflection axis. The deflection axis is an imaginary line, preferably inside the deflecting edge, which extends along the longitudinal extension of the deflecting edge and the adhesive tape is deflected around it. The deflection axis preferably has a constant spacing in the longitudinal direction of the deflecting edge from the abutment surface of the adhesive tape on the deflecting edge.

The pulled-off adhesive tape is deflected from the pull-off direction in a plane of the adhesive tape roll into an affixing direction transversely to the plane of the adhesive tape roll. By the plane of the adhesive tape roll is meant here a plane which extends along the principal directions of extension of the adhesive tape roll. In this plane, the adhesive tape roll is formed substantially and preferably exactly as a circle.

The adhesive tape dispenser according to the invention makes use of the idea of altering or further developing the usual geometry of the guide system for the pulled-off adhesive tape such that the plane of the adhesive tape roll and the affixing direction of the adhesive tape are no longer arranged parallel to each other, but instead transversely to each other. This produces advantages in certain applications of the adhesive tape dispenser, since the adhesive tape roll with its sometimes large diameter of several centimeters, possibly even more than 10 cm, is no longer situated in the affixing direction of the affixed adhesive tape and the movement in the affixing direction might be hindered by the adhesive tape roll, for example if a component surface being taped is bounded at the end in the affixing direction by a wall standing off perpendicular to the component surface and the adhesive tape roll would bump against this wall when affixing the adhesive tape. Thanks to the arrangement of the adhesive tape roll transversely to the application direction of the adhesive tape, it is possible to bring up the adhesive tape dispenser closer to the boundary wall.

The term transversely should be interpreted here basically broadly, i.e., the adhesive tape is at first pulled off from the adhesive tape roll in a pull-off direction which lies preferably exactly in the plane of the adhesive tape roll and preferably parallel to the plane of the adhesive tape roll, while the pulled-off adhesive tape after running through the guide system and the deflecting device changes its direction so that an affixing direction, i.e., the longitudinal direction of the affixed adhesive tape, is situated transversely to the plane of the adhesive tape roll at an angle between 1° and 179° or 181° and 359°.

Advantageously, the adhesive tape is deflected in the deflecting device about a deflecting edge, and the deflecting edge has a deflection axis at an angle between 90.5° and 179.5° or 180.5° and 269.5° to the plane of the adhesive tape roll and/or to the end of the pull-off direction of the adhesive tape.

Especially preferably, the angle of the deflecting edge to the plane of the adhesive tape roll is 135° or 225° or ±20°, especially preferably ±10°, while any number of degrees between 115 and 155° or between 205° and 255° may also be used preferably here. In the most favorable embodiment, the deflecting edge is arranged at an angle of 135° or 225° and the adhesive tape is thereby deflected by 90° to the left or right.

In one preferred embodiment of the invention, an abutment is provided next to the deflecting device, which dictates a constant spacing between a component edge and an affixed adhesive strip during the process of affixing the adhesive tape to a component surface. The abutment has the function of a guiding of the adhesive tape dispenser along the component edge.

Advantageously, the abutment has a flat abutment surface, preferably is designed as a flat abutment surface, which can be pressed against the component edge, and the adhesive tape dispenser is pulled under constant contact of the abutment surface with the component edge along the component surface. The deflecting edge is arranged at a slant to the abutment surface, preferably the abutment surface is oriented parallel to the application direction.

Preferably, the abutment surface is adapted to the geometry of the component, in order to make possible a form-fitting guidance of the adhesive tape dispenser.

In one favorable development of the invention, the deflecting device is formed as a single piece, and the abutment surface is provided on a side facing the component, and a strip which projects toward the component and one long side of which is beveled and forms the deflecting edge is provided at the user side of the abutment surface. The deflecting device is preferably designed as a deflection block, in which the abutment is formed integrally; the strip projecting from the deflection block is formed by the formation of the abutment surface. The abutment surface and the component side of the narrow strip may be adapted to a special contour of a gap or the like to be taped up.

In the application process, the strip projects toward the component to be taped up with the adhesive tape. The strip projecting toward the component is beveled at one free corner, and this beveling can form the deflecting edge. The integral formation of the abutment surface and the deflecting edge can be produced especially economically and maintenance free.

The deflecting edge advantageously has a bevel in order to make possible a targeted application of the adhesive tape.

Preferably, a pressing means for the affixed adhesive tape is provided on a side of the projecting strip facing away from the user. The pressing means may be a felt strip.

Especially preferably, the guide system has a plurality of deflecting rollers and guide rollers, especially preferably the deflecting device has at least two rollers with laterally radially lengthened cheeks and at least two straight rollers. The former are basically H-shaped in cross section; the H-shaped rollers and the straight rollers advantageously alternate in the pull-off direction.

In addition, embodiments are possible which comprise only one deflecting roller.

Since the adhesive tape has one glue side and one backing side and the backing side is not sticky while the glue side is sticky, the pulled-off adhesive tape is led across the rollers of the guide system, and the pulled-off adhesive tape rolls across certain rollers by its non-sticky backing side and across other rollers by its sticky glue side.

Preferably the rollers which are in communication with the sticky glue side are plastic rollers or they have at least a plastic jacketing, forming the contact with the sticky layer, while the rollers which are in communication with the backing side of the adhesive tape may be metal rollers, preferably steel rollers. Preferably at least the jacketing is coated with metal.

Preferably two handles emerge from the deflecting device, advantageously from the deflection block, which are oriented in the affixing direction of the adhesive tape and which can be grabbed by the user with one hand. The handles may be folding in design.

But it is also conceivable to provide a bow handle arranged on the user side of the deflection block.

In a second aspect, the object of the invention is achieved by a method with the features of claim 12.

The method is especially suited to be carried out with one or more of the above mentioned adhesive tape dispensers.

According to the invention, the adhesive tape is pulled off from an adhesive tape roll and led through a guide system, and the pulled-off adhesive tape is deflected by means of a deflecting device from a pull-off direction in a plane of the adhesive tape roll into an affixing direction transversely to the plane of the adhesive tape roll and the deflected adhesive tape is affixed to the component surface. The adhesive tape is affixed by its sticky side to the component surface. Thanks to the deflecting of the adhesive tape after being pulled off from the adhesive tape roll, the pull-off direction and the affixing direction no longer coincide, but instead are arranged transversely to each other.

For this, the adhesive tape dispenser is advantageously held by the handle or handles with both of the user's hands and guided from left to right or from right to left transversely in front of the user by hand, while the adhesive tape roll is situated in the longitudinal direction with the plane perpendicular to the user and rolls off in this way. Thanks to arranging the adhesive tape roll perpendicular or at least transversely to the affixing direction, the adhesive tape dispenser can be moved up closer to a lateral boundary wall of the component surface situated in the affixing direction.

Preferably the adhesive tape dispenser is guided by means of an abutment arranged on the adhesive tape dispenser at a constant spacing from the component edge. The abutment is advantageously designed as an abutment surface, which can be let into a recess in the deflection block, for example, so that the adhesive tape dispenser is pressed by its abutment surface against the edge of the component and then pulled along an edge on the component under constant contact of the abutment surface with the edge of the component and in the process adhesive tape is continuously affixed to the component surface at a constant spacing from the edge of the component surface.

Preferably adhesive tape is deflected by one of the aforementioned angles, advantageously at an angle of 10 to 179° or 181° to 359°, preferably at an angle of 90° or 270°±20°, especially preferably ±10°.

In addition, a glue side of the adhesive tape is deflected from a side of the pulled-off adhesive tape facing the user to a side of the affixed adhesive tape facing away from the user, i.e., not only is the pull-off direction of the adhesive tape changed, but also the orientation of the adhesive tape, since a side of the adhesive tape facing the user is situated away from the user after the deflecting device. This side is therefore preferably the sticky glue side of the adhesive tape.

BRIEF DESCRIPTION OF THE DRAWINGS

The invention shall be described with the aid of an exemplary embodiment in ten figures, there being shown.

DETAILED DESCRIPTION

Figure 1:
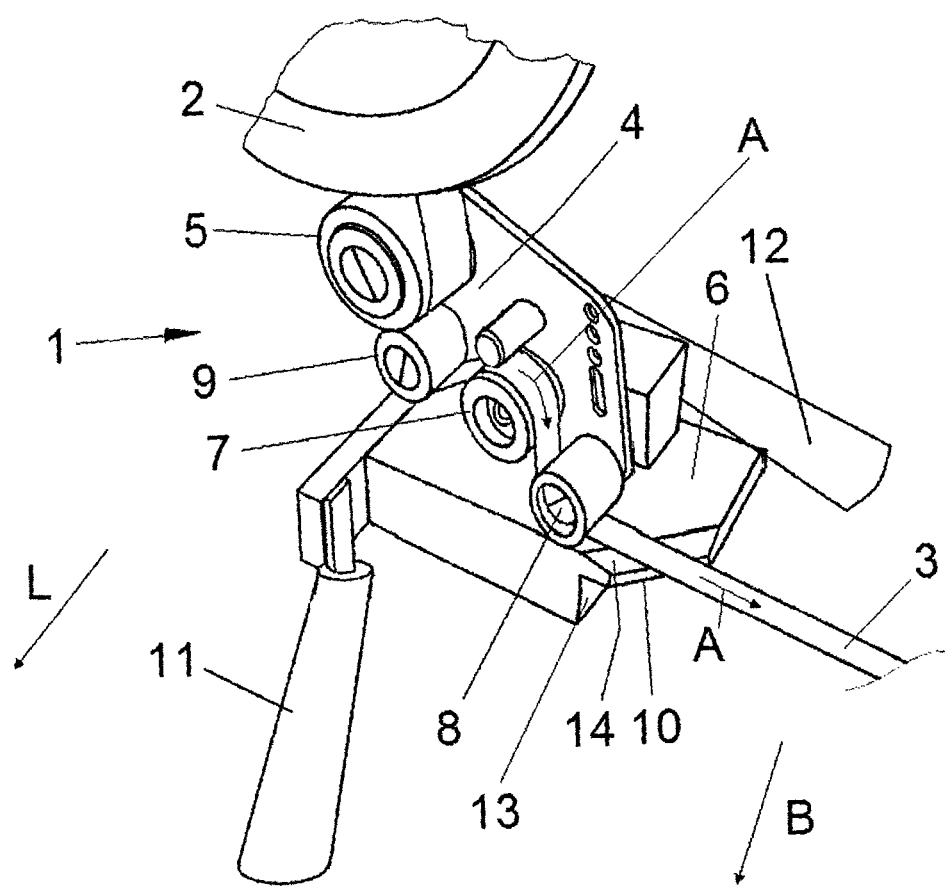
FIG. 1 a first perspective view of a cutout feature of an adhesive tape dispenser according to the invention with adhesive tape, FIG. 2 a second perspective view of the adhesive tape dispenser according to the invention with deflected adhesive tape, FIG. 3 the adhesive tape dispenser of FIGS. 1 and 2 in a side view during the affixing of an adhesive tape, FIG. 4 an enlarged view from a different perspective of FIG. 3, FIG. 5 a mirror-image adhesive tape dispenser in a side view, FIG. 6 a deflecting edge of the mirror-image adhesive tape dispenser in FIG. 5, FIG. 7 the adhesive tape dispenser in a front view with two handles, FIG. 8 the adhesive tape dispenser in FIG. 7 in a top view with two handles, FIG. 9 the adhesive tape dispenser with only one handle, FIG. 10 the adhesive tape dispenser with only one other handle.

An adhesive tape dispenser 1 shown schematically in FIG. 1 shows a cutout feature of an adhesive tape roll 2, on which an adhesive tape 3 is wound. The adhesive tape 3 has a backing layer and a glue layer. The backing layer and the glue layer respectively form an outer side of the adhesive tape 3. The glue layer in FIG. 1 is arranged radially on the inside of the backing layer of the adhesive tape 3 wound on the adhesive tape roll 2.

The adhesive tape roll 2 has a centrally arranged opening (not shown), which is mounted rotatably on a pin (not shown) of the adhesive tape dispenser 1. The pin is arranged relatively movably to a guide system. The guide system in this embodiment has a metal sheet 4 and a first deflecting roller 5 projecting from the metal sheet 4 and mounted rotatably on it. The pin is preferably pretensioned by a compression spring in the direction of the first deflecting roller 5, so that the adhesive tape 3 wound on the adhesive tape roll 2 has constant contact with the first deflecting roller 5 regardless of the number of already wound adhesive tape layers with decreasing radius.

The adhesive tape 3 is brought up via the guide system to a deflecting edge 10. The guide system in the embodiment of FIG. 1 comprises, besides the metal sheet 4, a plurality of guiding and deflecting rollers 7, 5, 8, 9, whose axes of rotation are parallel to each other and all of them project from the same side of the metal sheet 4. The metal sheet 4 is mounted on a fastening block 6, one side of which is formed integrally with the deflecting edge 10.

According to one variant of the adhesive tape dispenser 1, the deflecting edge 10 is provided on a further application block which is not configured as one piece with the fastening block 6. The two blocks may be connected by screws. The advantage of this variant is that only the application block with the deflecting edge 10 can be adapted project-specifically. Wear on the deflecting edge 10 leads to the occasional exchange of the latter.

In FIG. 1 three deflecting rollers 5, 8, 9 and one guide roller 7 are provided. The first deflecting roller 5 is situated with its axis of rotation parallel to the longitudinal axis of the pin immediately next to the adhesive tape roll 2, such that the outermost adhesive tape layer has direct contact with the first deflecting roller 5 and the adhesive tape 3 pulled off from the adhesive tape roll 2 is led roughly halfway around the circumference of the first deflecting roller 5. In particular, the first deflecting roller 5 has radially elongated cheeks, in order to prevent the adhesive tape 3 from slipping sideways off from the first deflecting roller 5.

In a pull-off direction A, a second deflecting roller 9 is provided opposite the adhesive tape roll 2 and next to the first deflecting roller 5. The adhesive tape 3 is led during the pull-off process between the first deflecting roller 5 and the second deflecting roller 9 and stands in contact with both rollers. In the pull-off direction A, a guide roller 7 is provided after the second deflecting roller 9. The guide roller 7 and the first deflecting roller 5 are preferably metal rollers, preferably steel rollers, while the second deflecting roller 9 and the third deflecting roller 8 are designed as plastic rollers. The material specifications pertain to the abutment surfaces of the rollers across which the adhesive tape 3 runs. The choice of different materials will generally allow for the fact that the plastic rollers, i.e., the second deflecting roller 9 and a third deflecting roller 8, are in contact with the glue side of the adhesive tape 3 during the pull-off process, while the metal rollers, i.e., the first deflecting roller 5 and the guide roller 7, are in contact with the non-sticky backing layer of the adhesive tape 3.

In the pull-off direction A after the guide roller 7 there is provided the third deflecting roller 8, which in turn has a plastic abutment surface for the sticky side of the adhesive tape 3. The third deflecting roller 8 preferably does not touch the side of the fastening block 6 facing the user. The adhesive tape 3 is led between the side of the fastening block 6 facing the user and the third deflecting roller 8, in contact with both of them, up to a deflecting edge 10. The deflecting edge 10 is arranged at an angle of 45° to the pull-off direction of the adhesive tape 3 directly after the third deflecting roller 8. The deflecting edge 10 is arranged in particular also at an angle of 45° to the plane formed by the adhesive tape roll 2. The deflecting edge 10 is sharp enough in configuration that a deliberate pressing of the adhesive tape 3 deflected around it per FIG. 2 against a component surface is possible. However, the deflecting edge 10 should not be so sharp that the adhesive tape 3 could be severed by it.

The deflecting edge 10 has a sufficiently large radius and merely deflects the adhesive tape 3. Contact with the component occurs only after the deflecting.

From the fastening block 6 there emerge two handles 11, 12 respectively oriented in a longitudinal direction L. The two handles 11, 12 are each formed from a tube, whose longitudinal axis oriented in the longitudinal direction L runs parallel to the axis of rotation of the adhesive tape roll 2 and also the longitudinal axes of the deflecting and guide rollers 5, 8, 9, 7 as well as the longitudinal axis of the pin.

The adhesive tape dispenser 1 is grabbed by the user with both hands on the handles 11, 12 and guided in the longitudinal direction L, downward and to the left in FIG. 1, so that the adhesive tape 3 is affixed by its glue side to a component surface, not shown.

Figure 2:
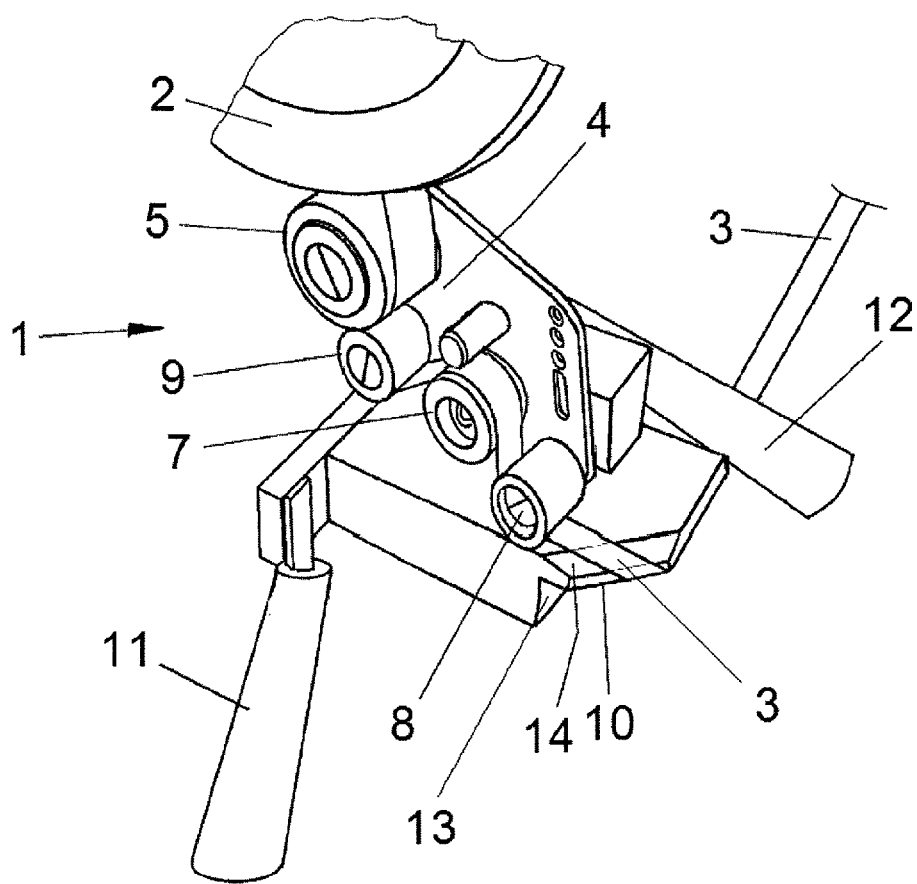

FIG. 2 shows the arrangement in FIG. 1. There is only a difference in the arrangement of the adhesive tape 3, whose end segment has been laid around the deflecting edge 10. The glue side of the adhesive tape 3 in FIG. 2 prior to the deflecting is facing toward the observer and after the deflecting it is facing away from the observer, so that it can be placed on a component surface 16. Next to the deflecting edge 10, there is integrally formed in the deflection block 6 an abutment surface 13, the abutment surface 13 being the wall of a recess introduced into the deflection block 6.

The deflecting edge 10 is formed as a beveled corner of a strip projecting from the fastening block 6. For a narrower deflecting edge 10, a bevel 14 is formed, running from the side of the fastening block 6 facing the user to the deflecting edge 10.

The application of the adhesive tape 3 is done in the longitudinal direction L in FIG. 2, so that the adhesive tape dispenser 1 is held with both hands on the two handles 11, 12 and moved along an affixing direction B, here preferably corresponding to the longitudinal direction L. The adhesive tape 3 is applied for example as masking tape to the component surface 16, such as the bodywork of an automobile or its attachment parts (such as parts made of metal (body shell/tailgate/door) or plastic (bumper)).

Figure 3:
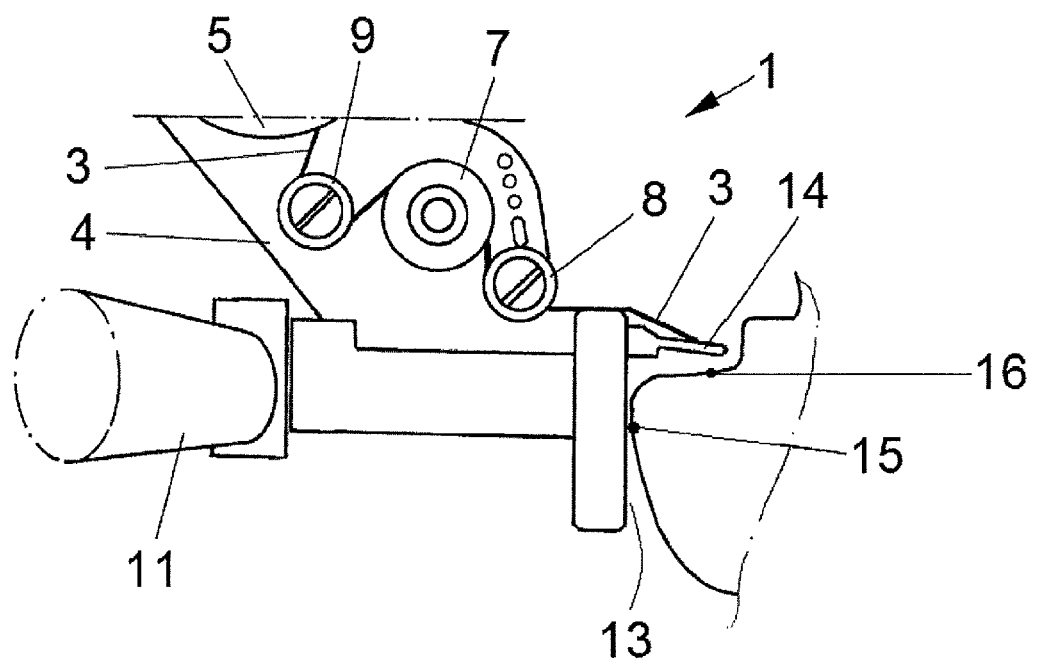
Figure 4:
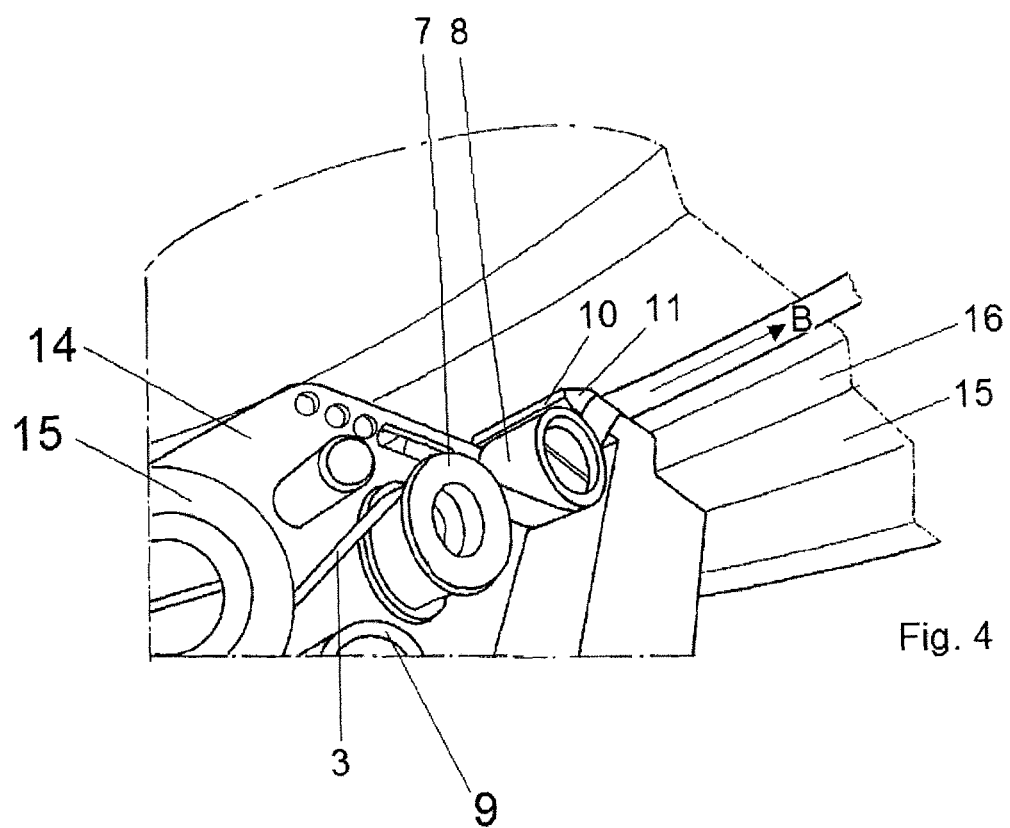

FIG. 3 shows the adhesive tape dispenser 1 in a side view during operation; the user of the adhesive tape dispenser 1 is not shown. During its use, however, the two handles 11, 12 are grasped by the user and the adhesive tape dispenser 1 is pressed by the abutment surface 13 against a component edge 15 of the component surface 16, so that a guiding of the adhesive tape dispenser 1 is made possible and the adhesive tape 3 is applied to the component surface 16 at a constant spacing from the component edge 15 of the component surface 16 along the longitudinal direction L. FIG. 4 shows an enlarged view of FIG. 3 with an adhesive tape 3 already affixed to the component surface 16.

FIG. 4 shows the arrangement of FIG. 3 in a different perspective. In all figures, the reference numbers denote the same components.

The use of the adhesive tape dispenser 1 may occur as depicted or also in any other orientation, preferably as depicted or rotated by 180°.

Figure 5:
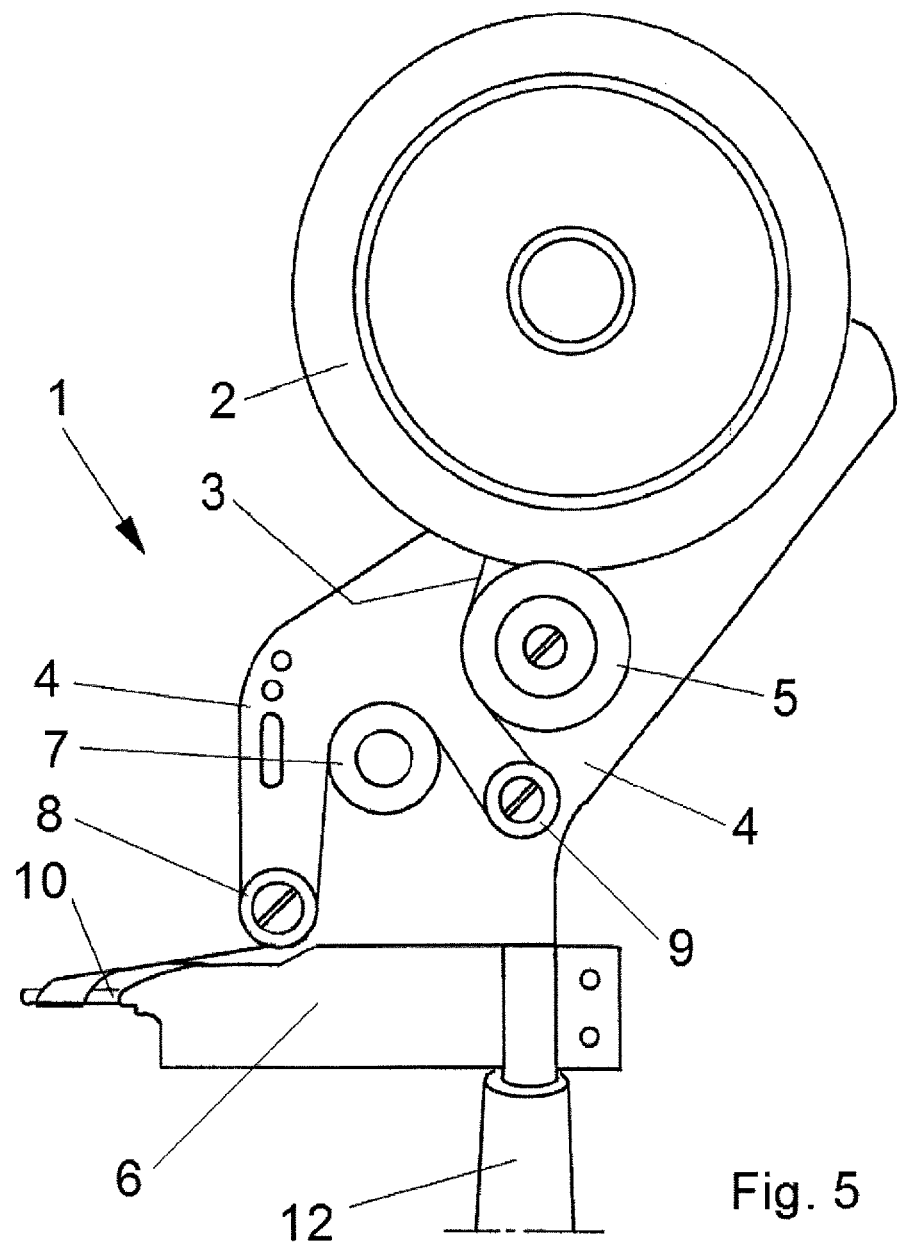

FIG. 5 shows a mirror-image adhesive tape dispenser 1 as compared to the adhesive tape dispenser 1 in FIG. 1-4, the same reference numbers denoting the same components as for the adhesive tape dispenser, even if designed or mounted in mirror-image fashion. The mirror-image adhesive tape dispenser 1 is characterized with respect to the adhesive tape dispenser 1 in that the deflecting rollers 5, 8, 9, the adhesive tape roll 2 and the guide roller 7 are not arranged on the one side of the metal sheet 4 as in the adhesive tape dispenser 1 of FIG. 1-4, but rather stick out from the other opposite side of the metal sheet 4, the positions being preserved in mirror image. The deflecting edge 10 is likewise designed in mirror-image fashion, the mirror plane being formed by the plane of the metal sheet 4, more precisely by a mid plane of a principal surface of extension of the metal sheet 4. Thus, the adhesive tape 3 is deflected in an opposite affixing direction −B to the left in the case of the mirror-image adhesive tape dispenser 1 in FIG. 5 and to the right in the affixing direction B for the adhesive tape dispenser 1 of FIG. 1, each time as seen from the user, who is looking at the component to be worked.

Figure 6:
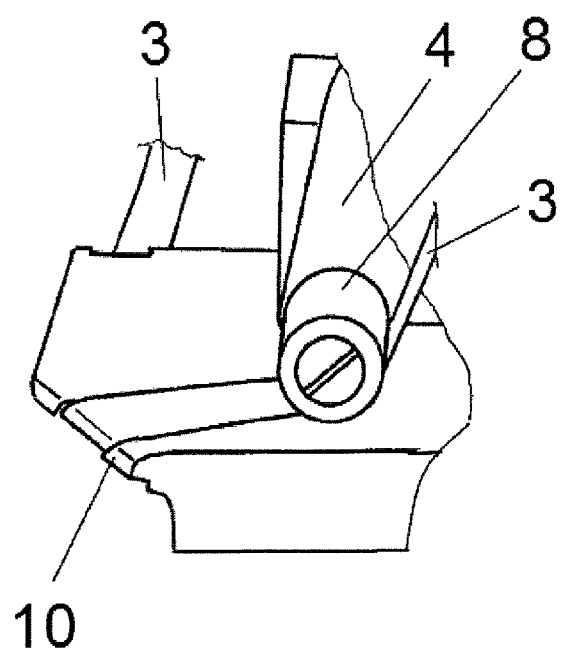

FIG. 6 shows a detail view of FIG. 5 in a perspective top view, the detail view including the deflecting edge 10 and the third deflecting roller 8.

Furthermore, it is shown that the deflecting edge 10 comprises a guide groove, along which the deflected adhesive tape 3 is led.

Figure 7:
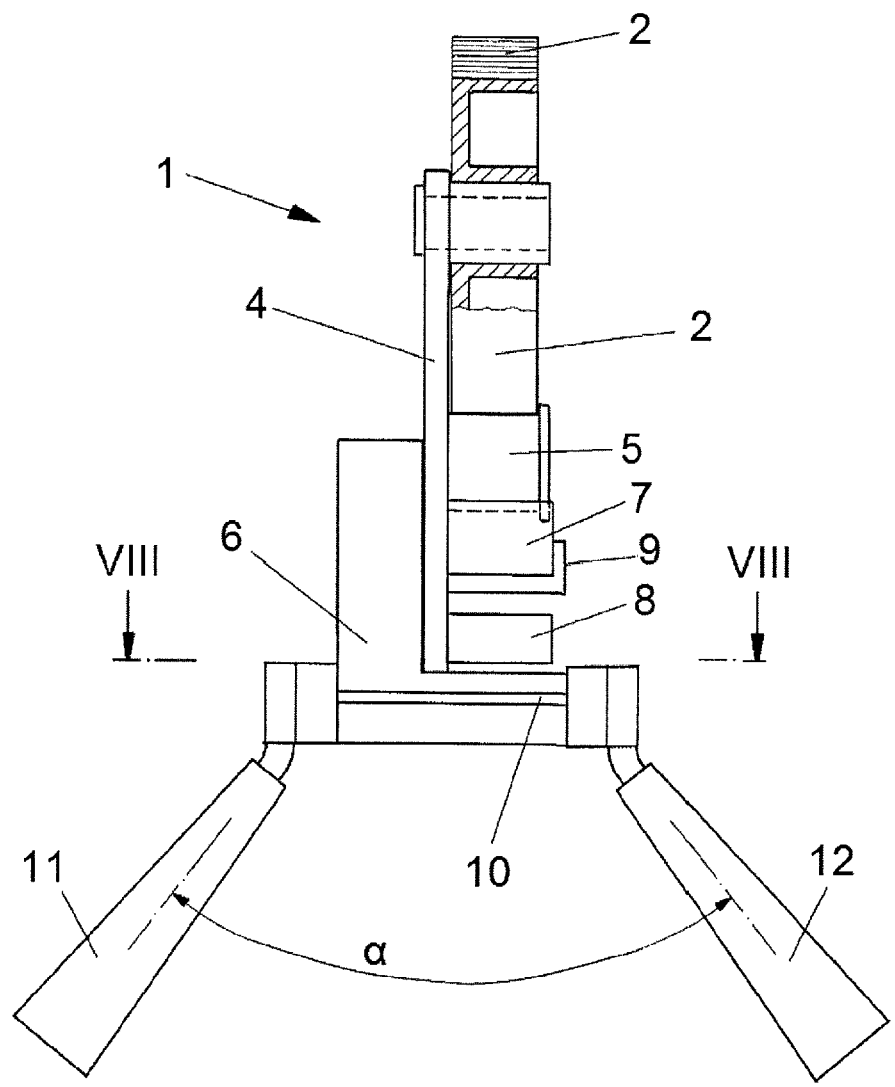

FIG. 7 shows the mirror-image adhesive tape dispenser 1 in a front view, i.e., as seen from the component to be worked, the rollers stick out from the other side of the metal sheet 4. The metal sheet 4 is placed by its projecting rollers on the fastening block 6 and screwed onto or otherwise fastened to it at the side. The fastening block 6 has the deflecting edge 10 with bevel on the end facing the component to be worked.

Figure 8:
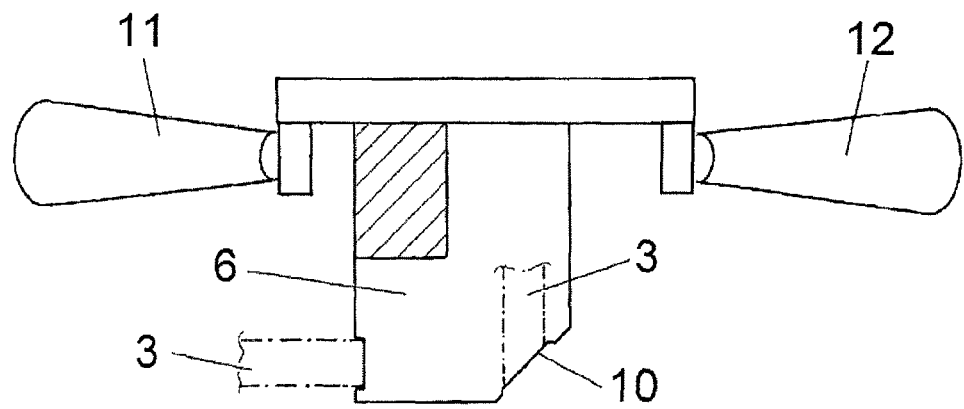

The two handles 11, 12 are arranged at an angle α to each other, the handle arrangement may vary, FIG. 8 shows the handle arrangement in a view from a cross section along the line VIII-VIII in FIG. 7.

Figure 9:
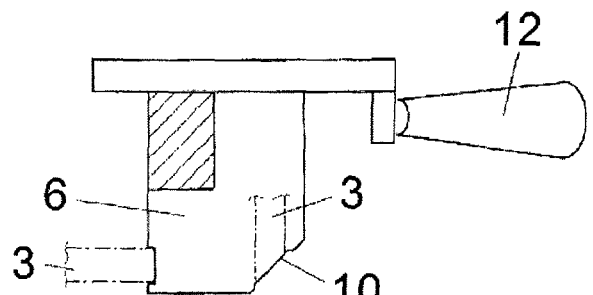
Figure 10:
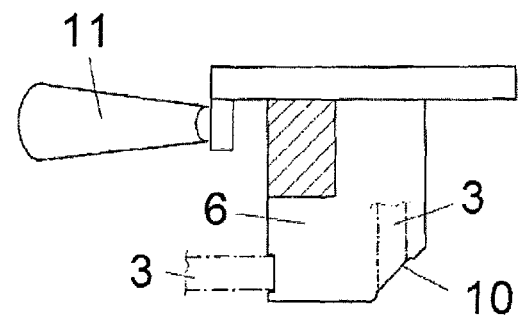

In FIGS. 8, 9 and 10 the adhesive tape dispenser 1 of FIG. 5, 6 is shown in a schematic top view, as seen from the cross section surface VIII-VIII. In FIG. 8 the adhesive tape dispenser 1 is shown with a handle 11 and another handle 12. However, other embodiments of the adhesive tape dispenser 1 and also of the mirror-image adhesive tape dispenser 1 are also conceivable. These are represented in FIGS. 9 and 10, where FIG. 9 shows an adhesive tape dispenser 1 with only the one handle 11 and FIG. 10 shows an adhesive tape dispenser 1 with only the other handle 12. Apart from the handle position, however, the adhesive tape dispensers 1 of FIGS. 8, 9 and 10 are of the same design as the adhesive tape dispenser of FIG. 5, 6. A corresponding arrangement of the handles 11, 12 is of course also possible for the non-mirror-image adhesive tape dispenser 1.

LIST OF REFERENCE NUMBERS

1 Adhesive tape dispenser
2 Adhesive tape roll
3 Adhesive tape
4 Metal sheet
5 First deflecting roller
6 Fastening block
7 Guide roller
8 Third deflecting roller
9 Second deflecting roller
10 Deflecting edge
11 Handle
12 Handle
13 Abutment surface
14 Bevel
15 Component edge
16 Component surface
18 Adhesive tape
A Pull-off direction
B Affixing direction
−B Opposite affixing direction
L Longitudinal direction

What is claimed is:
1. An adhesive tape dispenser comprising:
a holder for an adhesive tape roll;
a guide system for an adhesive tape pulled off from the adhesive tape roll; and
a deflecting device comprising a deflecting edge for the pulled-off adhesive tape, wherein the deflecting edge is arranged at an end of the guide system in a pull-off direction; wherein the deflecting edge is configured to deflect the pulled-off adhesive tape from the pull-off direction; wherein the deflecting edge has a deflection axis extending longitudinally in a plane parallel to the deflecting edge, and wherein the pulled-off adhesive tape is deflected around the deflecting edge in an affixing direction arranged transversely to the pull-off direction; wherein the pulled-off adhesive tape is deflected at an angle of 70° to 110° or 250° to 290° in the affixing direction; wherein the adhesive tape com- prises an adhesive side; wherein when the adhesive tape exits the guide system, the adhesive side, prior to the deflecting of the adhesive tape, is oriented in a first orientation facing towards a user; wherein the adhesive side, after the deflecting of the adhesive tape, is oriented in a second orientation facing away from the user;

a pressing means arranged on a surface of the deflecting device facing the affixing-direction.

2. The adhesive tape dispenser of claim 1, wherein the affixing direction is arranged transversely to a plane of the adhesive tape.

3. The adhesive tape dispenser of claim 1, wherein the affixing direction is arranged at an angle between 1° and 179° or between 181° and 359° to the pull-off direction of the adhesive tape in a plane of the adhesive tape.

4. The adhesive tape dispenser of claim 3, wherein the deflection axis is arranged at an angle between 90.5° and 179.5° or between 180.5° and 269.5° to a longitudinal direction of the adhesive tape in the pull-off direction.

5. The adhesive tape dispenser of claim 4, wherein the deflecting edge is arranged at an angle of 115° to 155° or 205° to 255° to the adhesive tape plane.

6. The adhesive tape dispenser of claim 1, wherein the deflecting device further comprises an abutment surface adjacent to the deflecting edge and configured to dictate a constant spacing between the adhesive tape and an edge of a component that the adhesive tape is to be affixed to.

7. The adhesive tape dispenser of claim 6, wherein the abutment surface is flat and the deflecting edge is arranged at a slant to the abutment surface.

8. The adhesive tape dispenser of claim 6, wherein the deflecting device is formed as a single piece and has the abutment surface on a side facing the pull-off direction and a flange projecting in the pull-off direction, wherein one corner of the flange is beveled and forms the deflecting edge.

9. The adhesive tape dispenser of claim 1, wherein the deflecting edge comprises a guide groove through which the deflected adhesive tape is led.

10. The adhesive tape dispenser of claim 1, wherein the guide system comprises a roller having laterally radially lengthened cheeks and also a straight roller.

11. A method for affixing an adhesive tape to a component surface, the method comprising:
    providing an adhesive tape dispenser comprising:
        a holder for an adhesive tape roll;
        a guide system for the adhesive tape pulled off from the adhesive tape roll; and
        a deflecting device comprising a deflecting edge;
    pulling the adhesive tape from the adhesive tape roll;
    leading the adhesive tape through the guide system in a pull-off direction; and
    deflecting the pulled-off adhesive tape around the deflecting edge in an affixing direction transverse to the pull-off direction; wherein the pulled-off adhesive tape is deflected at an angle of 70° to 110° or 250° to 290° in the affixing direction; wherein the deflecting edge comprises a deflecting axis extending longitudinally in a plane parallel to the deflecting edge; wherein the deflecting edge further comprises a pressing means arranged on a surface of the deflecting device facing the affixing direction; wherein the adhesive tape comprises an adhesive side; wherein when the adhesive tape exits the guide system, the adhesive side, prior to the deflecting of the adhesive tape, is oriented in a first orientation facing towards a user; wherein the adhesive side, after the deflecting of the adhesive tape, is oriented in a second orientation facing away from the user.

12. The method of claim 11, wherein the deflective device comprises an abutment; wherein the method further comprises guiding the adhesive tape dispenser at an edge of the component surface at a constant spacing from the edge of the component surface.

* * * * *